United States Patent [19]

Wessling et al.

[11] 4,427,819

[45] Jan. 24, 1984

[54] ANIONIC STRUCTURED PARTICLE LATEXES

[75] Inventors: Ritchie A. Wessling, Midland; Dale M. Pickelman, Auburn, both of Mich.

[73] Assignee: The Dow Chemical Company, Midland, Mich.

[21] Appl. No.: 388,065

[22] Filed: Jun. 14, 1982

Related U.S. Application Data

[63] Continuation-in-part of Ser. No. 162,289, Jun. 23, 1980, Pat. No. 4,337,185.

[51] Int. Cl.$^3$ .............................................. C08L 41/00
[52] U.S. Cl. ..................... 524/458; 523/201; 524/460; 524/535; 525/291
[58] Field of Search .................. 524/458, 460, 535; 523/201; 525/291, 902

[56] References Cited

U.S. PATENT DOCUMENTS

| | | | |
|---|---|---|---|
| 3,363,029 | 1/1968 | Verdol | 525/285 |
| 3,489,699 | 1/1970 | Battaerd | 525/291 |
| 3,745,196 | 7/1973 | Lane | 525/291 |
| 3,787,522 | 1/1974 | Dickie | 525/902 |
| 3,880,793 | 4/1975 | Nakayama | 524/751 |
| 4,122,052 | 10/1978 | Aihara | 523/400 |
| 4,293,476 | 10/1981 | Moore | 525/902 |

*Primary Examiner*—Paul R. Michl

[57] ABSTRACT

Structured particle latexes contain organic polymer particles in aqueous media having a nonionic core encapsulated by a thin layer of a water-insoluble copolymer containing pH independent stabilizing anionic groups such as sulfonate groups chemically bound at or near the particle surface.

2 Claims, No Drawings

ANIONIC STRUCTURED PARTICLE LATEXES

CROSS-REFERENCE TO RELATED APPLICATIONS

This application is a continuation-in-part of application Ser. No. 162,289, filed June 23, 1980, now U.S. Pat. No. 4,337,185.

BACKGROUND OF THE INVENTION (1) Field of the Invention

The invention is concerned with anionic structured particle latexes. The polymer particles comprising the latex have stabilizing, pH independent anions which are chemically bound at or near the surface of the particles.

(2) Description of the Prior Art

Latexes require some means for providing colloidal stabilization in aqueous media. The usual colloidal stabilization is provided by surfactants which usually are anionic or cationic but may be nonionic, especially in mixtures with anionic or cationic surfactants. Even though they contribute to the required colloidal stability, the surfactants can interfere with coating performance of the latexes even though the amount is limited and less than the desired stability is obtained. Another method is to copolymerize with nonionic monomers a small proportion of an ionic monomer to prepare a stable latex with little or no conventional surfactant as described in U.S. Pat. No. 3,617,368. Such processes, however, require special combinations of monomers and special polymerization techniques. Although such processes produce latexes having little or no surfactants, varying amounts of water-soluble products are made during carrying out of the process and remain in the product.

Aqueous colloidal dispersions (latexes), stabilized by adsorbed interfacially spreading polyelectrolytes, are described in U.S. Pat. No. 3,965,032. Latexes made by that approach have excellent stability and are particularly useful in applications like coatings where conventional surfactants interfere with performance. However, in some cases (e.g., beater addition), the adsorbed polymer layer can be desorbed causing interference with deposition and thereby limiting utility.

Latexes containing generally less than a monolayer of pH independent anionic groups attached to the particle are described in U.S. Pat. No. 3,640,992, issued to David P. Sheetz. Other previous methods available for introducing pH independent anionic groups, such as by reactions at the latex particle surface, are slow and inefficient in comparison with cation forming reactions and the maximum amount of charge that can be introduced by these methods is low. The latexes require further stabilization by added conventional surfactants in order to be useful in many applications.

SUMMARY OF THE INVENTION

This invention concerns a latex having structured particles consisting of a water-insoluble, nonionic, organic polymer core encapsulated with a thin layer of a copolymer having chemically bound, pH independent anionic groups which are at or near the outer surface of the particles. Such latexes may be obtained by the emulsion polymerization of a reactive polymeric surfactant (RPS) either by (a) simultaneous copolymerization with other ethylenically unsaturated monomers which are capable of forming water-insoluble polymers or (b) polymerization of the reactive polymeric surfactant in the presence of a preformed latex stabilized by a low level of bound or adsorbed ions, thus binding the polymer of the reactive polymeric surfactant onto the particle surface. The latexes of either type have structured particles consisting of a water-insoluble, nonionic organic polymer core encapsulated with a layer of a copolymer having pH independent anionic groups chemically bound at or near the outer surface of the structured particle, the amount of said groups being sufficient to provide at least the major portion of the colloidal stability but insufficient to make the polymer water soluble.

DESCRIPTION OF THE PREFERRED EMBODIMENTS

In one embodiment, the preparation of the products of this invention requires a reactive polymeric surfactant (RPS).

The reactive polymeric surfactants are substantially linear, synthetic, water-soluble or water-dispersible organic polymers bearing a plurality of pH independent, randomly distributed anionic groups and at least one water-insensitive reactive functional group which is either in the polymer backbone or pendant therefrom. As used herein, the term "water-insensitive" as applied to the reactive group, means that the reactive group does not interfere with emulsion polymerization or react so rapidly with an aqueous polymerization medium that the group is not available for the desired reactions. The reactive functional group provides a cross-linking or grafting site when the reactive polymeric surfactant is adsorbed on a substrate. A wide variety of functional groups may be employed. Groups that undergo free radical addition or chain transfer reactions are preferred. This group included ethylenic unsaturation both in the backbone or as pendant groups and pendant sulfhydryl (—SH) groups. Groups that undergo ionic condensation or coupling reactions in the presence of water can also be employed. Epoxy groups are of this type. The reactive functional groups may be part of the hydrophobic unit as, for example, a copolymerized butadiene unit, or it may be a substituent on the ionic group. The reactive group may be in the polymer, as made, or may be added by a subsequent "post-reaction."

By "water-soluble," as applied to the polymer, is meant a polymer which mixes spontaneously with water to form a homogeneous, thermodynamically stable, molecularly dispersed mixture. When such a water-soluble polymer is a surfactant, the polymeric surfactant molecules can migrate through an aqueous phase and adsorb on the surface of a dispersed phase.

Typically, the reactive polymeric surfactant is composed of a mixture of nonionic hydrophobic units and ionic hydrophilic units in chemically combined form. Preferably, the backbone of the reactive polymeric surfactant is formed by the polymerization of ethylenically unsaturated monomers. The nonionic, hydrophobic units suitably are derived from any copolymerizable ethylenically unsaturated monomer which, when in the form of an amorphous homopolymer, would have a solubility in water of less than 0.1 percent. The ionic hydrophilic units suitably are derived from ethylenically unsaturated, positively or negatively charged monomers which, when in the form of an amorphous homopolymer, would be soluble in water and which would remain substantiallly ionized over a broad pH range such as from 2 to 12.

The charge density required to render the interpolymer surface active depends strongly on the polarity of the hydrophobic sequences; e.g., sequences made up of relatively polar units like acrylonitrile require less charge to achieve optimum surface activity in an aqueous dispersion. On the other hand, a polymer containing nonpolar sequences like styrene will require proportionately more ionic or hydrophilic units to achieve the same level of activity. In some cases, it is advantageous to employ small amounts (e.g., usually less than about 15 weight percent and preferably from 0 to about 5 weight percent based upon the weight of the instant reactive polymeric surfactants) of very hydrophilic but not ionic comonomers for control of the surface activity and water solubility of the interpolymeric polyelectrolyte without having to use more of the ionic comonomers. Acrylamide, methacrylamide, hydroxyethyl acrylate and hydroxypropyl acrylate are particularly useful for this purpose. Low concentrations of monomers with weak acid or weak base groups and salts thereof may also be used provided that the pH independence of the RPS is not substantially altered, e.g., a minor amount of a vinyl monomer such as acrylic acid or aminoethyl methacrylate (or the hydrochloride salt thereof) could be included to promote adhesion, serve as reactive sites, etc.

A wide variety of ionic monomers may be employed including both positively and negatively charged species (e.g., sulfonate, sulfate, quaternary phosphonium groups, quaternary ammonium groups, pyridinium groups, sulfonium groups, isothiouronium groups and the like) to provide the ionic hydrophilic units. These monomers may be defined as being any ethylenically unsaturated ionic monomeric unit (i.e., repeat unit in the polymer chain) which when in the form of a homopolymer is water-soluble. This includes: 2-sulfoethyl methacrylate, sodium vinylsulfonate, 2-hydroxy-3-sulfopropyl methacrylate, 2-acrylamido-2-methylpropanesulfonic acid, sodium styrenesulfonate, sodium vinylbenzyl sulfonate and the like.

Various methods may be used to make interpolymers of nonionic and ionic monomers. Both solution and emulsion processes can be employed. The reaction can be batch, semi-continuous or continuous.

The preferred method for making the anionic reactive polymeric surfactants is to copolymerize anionic and nonionic monomers in a compatibilizing solvent medium such as in the process of U.S. Pat. No. 3,917,574 (incorporated by reference).

The reactive polymeric surfactants have a number average molecular weight of from about 500 to about 40,000 and a charge density of from about 1 to about 4 milliequivalents per gram. Particularly useful are the reactive polymeric surfactants having a number average molecular weight of from about 500 to about 10,000, preferably less than 7,500, having a charge density of from about 1.8 to about 3.0 milliequivalents per gram and wherein the surfactant molecule contains at least two reactive sites. Where the reactive site is an activated olefinic double bond such as a methacryl or a sulfhydryl group or combinations including the above, a small number is sufficient, e.g., 2–4. These types are particularly suited for use in the capping process described below. Larger numbers of the less reactive sites are required. For example, at least about 8 sites per molecule are needed when the reactive site is an allyl type unsaturated olefin group. With butadiene units, best results are obtained with 20 or more. Reactive polymeric surfactants containing reactive sites derived from the incorporation of from about 33 to about 67 mole percent of butadiene units into the polymer are especially preferred in compositions where low film formation temperatures are desired. Hard reactive polymeric surfactant compositions, such as copolymers with 40 to 75 weight percent of methyl methacrylate and/or styrene, are desirable in plastic pigments.

The reactive groups may be incorporated directly by using a 1,3-diene like butadiene or a divinyl monomer with double bonds of unequal reactivity such as allyl methacrylate.

The pendant reactive groups may be covalently bonded to the backbone through a hydrolytically stable divalent connecting group containing, for example, ester or amide links. Examples are

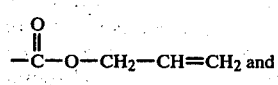

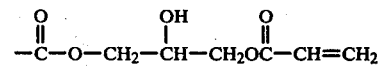

The reactive group may also be a substituent on an onium group attached to the polymer backbone, with the limitation that the number of such groups is not sufficient to affect the essentially anionic character of the reactive polymeric surfactant. Typically, no more than one or two such groups per molecule are needed. Examples are

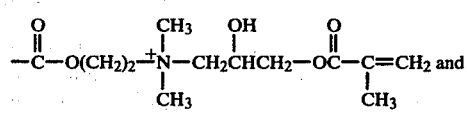

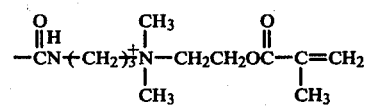

The pendant vinyl groups are conveniently formed by reacting a tertiary amino functional polymer surfactant with glycidyl methacrylate.

In one method of preparing the latexes of the present invention, a mixture of ethylenically unsaturated monomers is emulsion polymerized in the presence of a reactive polymeric surfactant and, optionally, also in the presence of small amounts of another surfactant which is capable of forming seed particles. The preferred classes of surfactants for seed preparation are nonpolymerizable ionic surfactants (e.g., as described in U.S. Pat. No. 3,965,032 and our copending application Ser. No. 123,321, filed Feb. 21, 1980), an ionic surfactant containing an ethylenically unsaturated group, or a mixture of the above. Preferably, an anionic surfactant contains an ethylenically unsaturated group which copolymerizes with the other monomers. Most preferred products are latexes devoid of conventional, adsorbed, low molecular weight surfactants.

In another method of preparing the products of this invention, ethylenically unsaturated monomers first are emulsion polymerized in the presence of a reactive polymeric surfactant and optionally a polymerizable soap to form a seed latex (i.e., a small particle size latex)

having a high charge density. Additional quantities of ethylenically unsaturated monomers are then added and emulsion polymerized to cause the particles of the seed latex to grow in size and to attain the desired charge density.

In order to grow into a structured particle latex, the seed composition must stay at the surface as the particle grows; therefore, it must be substantially uncrosslinked, i.e., must not be a microgel. This effect is accomplished such as by adjusting the initiator and chain transfer agent levels in the seed step and also by selecting the number and kind of reactive sites in the polymeric surfactant. In most cases, especially when polymerizing any highly reactive monomer like a diene or an acrylate, the use of a chain transfer agent is essential. The seed latex can be tested for crosslinking by dissolving it in a water-miscible coupling solvent such as tetrahydrofuran, tetrahydrofuran/alcohol mixtures, tetrahydrofurfuryl alcohol or the various alkoxy alkanols. Uncrosslinked seeds form clear solutions. Crosslinked seeds remain particulate and the resulting solvent mixture is visibly turbid.

In yet another method, ethylenically unsaturated monomers are emulsion polymerized in the presence of a reactive polymeric surfactant and an initial or starting latex. The particles of the starting latex thus are encapsulated with reactive, polymeric surfactants bound at or near the particle surface. The resulting latex comprises an aqueous colloidal dispersion of particles of polymer having pH independent anionic groups chemically bound at or near the particle surface. The latexes are particularly suited for use as coatings and as binders for composites.

Each of the foregoing embodiments has its advantages. For example, the encapsulation method is preferred when maximum control of the particle size and relatively low charge densities are desired. The seed/growth embodiment is particularly advantageous when very high bound charge densities are desired.

There are many known latexes which may serve as the starting latex to prepare the structured particle latexes of this embodiment and the composition is not narrowly critical. Such starting latexes are prepared by processes well known in the art. The starting latex, or components and methods for making such latex, are selected from the known latex compositions which preferably are substantially devoid of ionic groups and/or ionic surfactants of opposite charge adsorbed or otherwise attached to the polymer particles comprising the latex. Preferably, the latex is slightly anionic, usually from the presence of a small amount of an anionic surfactant. Even more advantageously, the anionic charge is derived from copolymerized ethylenically unsaturated surfactants.

The composition of the polymeric component of the starting latex also does affect certain properties of the final product since it constitutes a major portion of the total mass of the product. Thus, a selection will be made somewhat according to the desired polymeric properties known to be possessed by these prior art materials to supplment the properties which are attributable to the encapsulating component of the invention. Thus, as an illustration but not a limitation, for the predominant portion of the products, a starting latex which is film forming at room temperature will be selected but there are uses for which a nonfilm forming starting latex would be selected, such as for plastic pigments. Ordinarily, the starting latexes have a particle size of from about 500 Angstroms to about 10,000 Angstroms, preferably from about 800 Angstroms to about 3,000 Angstroms. If the products are to be used in a manner such as to require certain commonly recognized characteristics, for example, low electrolyte concentration, such characteristics will be considered when selecting the starting latex and the ingredients to be used in carrying out subsequent parts of the process. Such selections are within the skill of the art and are not considered inventive aspects of the novel compositions and method herein described.

Typically, the starting latexes are obtained by emulsion polymerization of one or more hydrophobic, ethylenically unsaturated monomers. Such monomers are represented by the same monomers listed below for copolymerization in the presence of reactive polymeric surfactants.

The starting latexes for encapsulation also may consist essentially of polymers which are not prepared readily from monomers by emulsion polymerization, either because no substantial polymerization at a commercially acceptable rate is obtained under usual emulsion polymerization conditions, such as with isobutene or because a particular form of the polymerized monomer is desired, for example, stereospecific polyisoprene, stereospecific polybutadiene and the like. Representative preformed polymers are polymers and copolymers of the monoolefins having from 2 to 20 carbon atoms such as ethylene, propylene, 1-butene, 2-butene, isobutene, pentene, hexene, octene, dodecene, hexadecene, octadecene and especially those monoolefins having up to 8 carbon atoms. Especially common types are the various ethylene/propylene copolymers and their halogenated derivatives.

Illustrative of still other polymers which may be constituents for the starting latex for encapsulation are alkyd resins, block and graft copolymers, e.g., styrene/butadiene graft and block copolymers, epoxy resins such as the reaction products of epichlorohydrin and bisphenol-A, and thermosettable vinyl ester resins, e.g., the reaction products of approximately equimolar amounts of a polyepoxide and an unsaturated monocarboxylic acid such as acrylic acid and methacrylic acid or unsaturated fatty acids such as oleic acid.

Methods for preparing the above-described polymers which are not readily obtained by emulsion polymerization and methods for converting the polymers to latexes are well known and are not a part of this invention.

The hydrophobic, ethylenically unsaturated monomers which may be copolymerized in the presence of the reactive polymeric surfactants may be selected from the known wide variety of nonionic, ethylenically unsaturated monomers which are polymerizable in aqueous emulsion to form a water-insoluble polymer. These monomers are well known in the art and hence are illustrated below only by representative examples. The nonionic ethylenically unsaturated monomers are represented by, but not restricted to, hydrocarbon monomers such as the styrene compounds, e.g., styrene, α-methylstyrene, ar-methylstyrene, ar-ethylstyrene, α,ar-dimethylstyrene, ar,ar-dimethylstyrene and t-butylstyrene; the conjugated dienes, e.g., butadiene and isoprene; the hydrocarbon monomers which are modified to possess nonionic substituents, e.g., hydroxystyrene, methoxystyrene and cyanostyrene; the unsaturated alcohol esters such as vinyl acetate and vinyl propionate; the unsaturated ketones, e.g., vinyl methyl ketone and methyl isopropenyl ketone; the unsaturated ethers, e.g., vinyl ethyl ether and vinyl methyl ether; and the nonionic derivatives of ethylenically unsaturated carboxylic acids such as acrylic esters, e.g., methyl acrylate, ethyl acrylate, butyl acrylate, hexyl acrylate, 2-ethylhexyl acrylate and lauryl acrylate; methacrylic esters, e.g., methyl methacrylate, ethyl methacrylate; the maleic esters such as dimethyl maleate, diethyl maleate and dibutyl maleate; the fumaric esters, e.g., dimethyl fumarate, diethyl fumarate and dibutyl fumarate; and the itaconic esters, e.g., dimethyl itaconate, diethyl itaconate and dibutyl itaconate; and the nitriles, e.g., acrylonitrile and methacrylonitrile. Also, nonionic monomers which form water-soluble homopolymers, e.g., acrylamide, methacrylamide, hydroxyethyl acrylate and hydroxyethyl methacrylate, may be mixed with a hydrophobic monomer in small amounts up to about 10 percent, based on the amount of hydrophobic monomer. Styrene/butadiene and acrylic compositions are preferred for applications requiring film-forming latexes.

The emulsion polymerization processes referred to in this specification can be carried out by free radical initiated polymerization by batch, continuous or controlled monomer feed processes using known conditions of stirring, time and temperature and known kinds of additives such as initiators, surfactants, electrolytes, pH adjusting agents, buffering agents and the like. Of course, it is critical to the method that the reactive polymeric surfactant is used by the process as described above. For high charge density latexes, the presently preferred process is one in which part of the ingredients are loaded initially into the reactor and reacted to form a seed latex, after which the remaining ingredients are fed into the reactor at the desired rates. While the reactive polymeric surfactant may be added batchwise, semicontinuously or continuously to the reaction mixture, it is preferred to add all of the reactive polymeric surfactant and a portion (one-third or less) of the monomers initially to form a very high charge density seed, then add and polymerize the remaining monomers to cause the particles of the seed latex to grow, especially when large particle size latexes are desired.

The initiators used in the emulsion polymerization processes are of the type which produce free radicals and conveniently are peroxygen compounds, for example: the persulfates such as potassium persulfate, sodium persulfate and ammonium persulfate; the inorganic peroxides such as hydrogen peroxide; the organic hydroperoxides such as cumene hydroperoxide and t-butyl hydroperoxide; the organic peroxides such as benzoyl peroxide, acetyl peroxide, lauroyl peroxide, peracetic acid and perbenzoic acid—sometimes activated by water-soluble reducing agents such as a ferrous compound, sodium bisulfite or hydroxylamine hydrochloride—and other free radical producing materials such as 2,2'-azobisisobutyronitrile. The inorganic persulfate, hydrogen peroxide, the organic hydroperoxides and azo compounds are preferred for making anionic latexes.

Most conventional chain transfer agents can be used in the process, with alkyl polyhalides and mercaptans being preferred. Examples are bromoform, carbon tetrachloride, carbon tetrabromide, bromoethane, alkyl mercaptans of 1 to 12 carbon atoms, thiophenol and hydroxyalkyl mercaptans. Combinations of hydrogen peroxide with mercaptoethanol are preferred.

Representative types of anionic emulsifiers are the alkyl aryl sulfonates, the alkali metal alkyl sulfates, the sulfonated alkyl esters, the fatty acid soaps and the like. Specific examples of these well-known emulsifiers are dodecylbenzene sodium sulfonate, sodium butyl naphthalene sulfonate, sodium lauryl sulfate, disodium dodecyldiphenyl ether disulfonate, n-octadecyl disodium sulfosuccinate and dioctyl sodium sulfosuccinate. Other species of useful anionic emulsifying agents will be known.

Typical nonionic emulsifiers (surfactants) are compounds formed by the reaction of an alkylene oxide, such as ethylene oxide, propylene oxide or butylene oxide with long chain fatty alcohols, long chain fatty acids, alkylated phenols, long chain alkyl mercaptans, long chain alkyl primary amines, for example, cetylamine, the alkylene oxides being reacted in a ratio of such as 5 moles to 20 moles or higher such as up to 50 moles per mole of the coreactant. Similarly effective compounds are monoesters such as the reaction products of a polyethylene glycol with a long chain fatty acid, for example, glycerol monostearate, sorbitan trioleate and partial and complete esters of long chain carboxylic acids with polyglycol ethers of polyhydric alcohols. By "long chain" in the above description is meant an aliphatic group having from six carbon atoms to 20 or more.

The product of this invention is a latex of which the colloidally dispersed polymer particles, having a particle size of from about 500 Angstroms to about 10,000 Angstroms, consist of the latex particles encapsulated with a bound layer having a thickness of from slightly greater than a monomolecular layer of the copolymer to about 100 Angstroms, the layer consisting of an anionic nondesorbable polymer. The anionic polymer is considered nondesorbable if it cannot be removed by simple physical processes such as dialysis.

The anionic latexes of the present invention have considerably improved chemical and mechanical stability when compared with latexes not having chemically bound charges. In many applications, however, such as in coating hydrophobic substrates, latexes stabilized only by charges chemically bound to the particle surface have too high surface tension to provide good wetting of the hydrophobic surface. In such instances, the addition to the latex of small amounts, such as from about 0.01 milliequivalent to about 0.1 milliequivalent per gram of polymer, of conventional ionic or nonionic surfactant is advantageous. In still other applications [such as in wet end addition of latexes to pulp to form composites (U.S. Pat. No. 4,225,383)], the presence of even small amounts of water-soluble surface active agents is detrimental. The latexes of the present invention are highly advantageous for such applications. Since a sufficient amount of charge is chemically bonded to the particle surface to provide colloidal stability, exhaustive dialysis or ion exchange can be used to remove water-soluble material from the latex and substitute counterions, if desired, while retaining ionic functionality and colloidal stability of the latex.

An acetone dilution test is a simple screening test for bound charges in aqueous colloidal dispersions in which the nonionic polymer component is insoluble in acetone. The test is particularly effective for styrene and styrene/butadiene compositions. In this test, 1 gram of the latex being tested at 10 percent solids is diluted with 9 grams of acetone and mixed. A positive test for bound charges results when no coagulum forms according to visual observation. A negative test result is reported when the colloidal dispersion destabilizes to form visible coagulum.

Exhaustive dialysis is a convenient method of characterizing the level of bound charge in a latex. A high fraction of bound charge (defined as the ratio of charge densities before and after dialysis) is indicative of good binding efficiency, which is particularly important in latexes with high levels of total charge. In such systems, low efficiency results in a substantial amount of water-soluble surface active species in the latex. The present process provides latexes with charge retentions of 60 to 100 percent, especially greater than 75 percent and therefore permits the preparation of structured particle latexes having bound charge densities in the range of 0.15 to 0.6 milliequivalent per gram (meq/g) and with low, noninterfering amounts of water-soluble fractions. The latexes are especially useful in making high strength nonwoven fibrous composites as described in U.S. Pat. No. 4,225,383.

A simple test is suitable to screen the latexes for shear stability: a drop of latex is placed in the palm of the hand and rubbed back and forth with a finger. As the latex is sheared, it gradually dries out and forms a film. Unstable latexes coagulate before drying, usually after one to three rubs. Stable latexes can be rubbed more than five cycles before failure. Latexes which tolerate 20 rubs are very stable and can be rubbed to dryness before setting up.

The rub test correlates with a more sophisticated test in which a drop of latex is sheared in a cone and plate viscometer (Rotovisco rotational viscometer). A very stable latex according to the rub test can be sheared for greater than 15 minutes at 194 rpm without coagulation of the latex.

The following examples illustrate ways in which the present invention can be practiced, but should not be construed as limiting the invention. All parts and percentages are by weight unless otherwise expressly indicated. Particle sizes shown are average particle diameters obtained by light scattering measurements, except as indicated.

EXAMPLE 1

Reactive Polymeric Surfactant having Pendant Methacrylate Groups

A base polymeric surfactant is prepared by adding 50 parts of isopropanol and 50 parts of water to a reactor which is provided with a nitrogen atmosphere, the reactor contents are heated to 50° C., 15 percent of previously prepared Feed Stream A and 15 percent of Feed Stream B are added to the reactor, then the balance of the feed streams are pumped into the reactor in a continuous manner over a period of 85 minutes and the resulting polymerization is allowed to continue for an additional three hours. To the product is added 250 parts of water and 250 parts of volatiles are stripped off. The feed streams have the following composition:

| Parts | Component |
|---|---|
| | Feed Stream A |
| 63.1 | methyl methacrylate |
| 30.3 | sulfoethyl methacrylate |
| 0.285 | t-butyl hydroperoxide (80%) |
| 0.657 | mercaptoethanol |
| 90 | isopropyl alcohol |
| | Feed Stream B |
| 93 | water |
| 0.15 | sodium formaldehyde hydrosulfite |
| 6.61 | dimethylaminoethyl methacrylate |

The resulting polymeric surfactant (PS-1) is converted to a reactive polymeric surfactant by heating with 5.97 parts of glycidyl methacrylate for 2 hours at 50° C. to form an adduct (RPS-1). The reactive polymeric surfactant, RPS-1, has a solids content of 25.7 percent (95.2 percent conversion), a total anionic charge of 1.58 milliequivalents per gram of solids and an $\overline{M}_n$ of less than 40,000.

Preparation of Seed Latexes

A mixture is prepared by stirring 25 parts of RPS-1, 25 parts of methyl methacrylate and 265.3 parts of water in a reactor. The resulting mixture is heated to, and maintained at, 50° C. under a nitrogen atmosphere while an initiator composition consisting of 0.1 part of tertiarybutylhydroperoxide in 9 parts of water and 0.075 part of sodium formaldehyde hydrosulfite in 9 parts of water is added in a continuous manner over one-half hour and heating is continued for an additional hour. The latex product (Latex 1A) has 14.7 percent of solids (98 percent conversion), 0.79 milliequivalent of anionic charge per gram of solids and a very small particle size as indicated by its translucent, bluish appearance.

Another latex is prepared in the same manner except that an equal weight of styrene is substituted for the methyl methacrylate. The latex product (Latex 1B) has 15.5 percent solids (100 percent conversion) and the latex has an appearance similar to Latex 1A. Both latexes are very stable and after drying, will redisperse in water. They are suitable for use as seed latexes to prepare larger particle-size structured particle latexes.

Preparation of a Styrene/Butyl Acrylate Latex using RPS-1

A latex is prepared by reacting 40 parts of styrene, 60 parts of butadiene and 15 parts of reactive polymeric surfactant RPS-1 in 315 parts of water by maintaining the temperature of the reactant composition at 50° C. in a reactor under nitrogen atmosphere while adding, with stirring, over 2.5 hours, an initiator composition containing 0.2 part of tertiarybutylhydroperoxide in 10 parts of water, 0.5 part of mercaptoethanol in 10 parts of water and 0.15 part of sodium formaldehyde hydrosulfite (Formopon) in 10 parts of water and maintaining the temperature with stirring for an additional 6 hours. Then, 250 parts of water are added and 250 parts of volatiles are removed by stripping under vacuum at 60° C. A clean, fluid, rub-stable latex (Latex 1C) is recovered having 25.4 percent of solids (100 percent conversion), an average particle diameter of 2280 Angstroms, a total charge per gram of solids of 0.237 milliequivalent and 0.188 milliequivalent of bound sulfonate group per gram of solids.

The latex is suitable for forming clear, tough, flexible films.

EXAMPLE 2

Reactive Polymeric Surfactant Having Pendant Allyl Groups

A reactive polymeric surfactant is prepared by adding 50 parts of t-butyl alcohol, 50 parts of water and 0.535 part of thiourea to a reactor which is provided with a nitrogen atmosphere, the reactor contents are heated to 50° C., 10 percent of each of previously prepared Feed Stream A and Feed Stream B are added to the reactor, then after one-half hour, the balance of the feed streams is pumped into the reactor in a continuous manner over a period of 2 hours and the resulting polymerization is allowed to continue for an additional 3 hours. To the product is added 500 parts of water and 500 parts of volatiles are stripped off at 50° C. under a pressure of about 100 millimeters of mercury. The feed streams have the following composition:

| Parts | Component |
|---|---|
| | Feed Stream A |
| 50.6 | methyl methacrylate |
| 19.1 | allyl methacrylate |
| 30.3 | sulfoethyl methacrylate |
| 3.87 | mercaptoethanol |
| 100 | t-butyl alcohol |
| | Feed Stream B |
| 37 | hydrogen peroxide (3%) |
| 75.5 | water |

The product obtained (RPS-2) consists of 731 parts of an aqueous solution containing 16.3 percent solids at a pH of 3 and having 1.27 milliequivalents of sulfonate group per gram of solids and a number average molecular weight of less than 40,000.

Preparation of a Seed Latex Using RPS-2

A mixture is prepared by stirring 50 parts of RPS-2, 50 parts of methyl methacrylate and 0.26 part of thiourea into 550 parts of water in a reactor. The resulting mixture is heated to, and maintained at, 50° C. under a nitrogen atmosphere. To the mixture is added 18 parts of 3-percent hydrogen peroxide over one-half hour and stirring is continued for an additional 5 hours. The product, Latex 2A, is a clean, stable poly(methyl methacrylate) latex having a very small particle size, as indicated by its translucent, bluish appearance and having 14.1 percent of solids (94 percent conversion). The latex is suitable as a seed to form larger particle-size, structured-particle latexes.

Preparation of a Styrene/Butyl Acrylate Latex Using RPS-2

A latex is prepared by reacting 40 parts of styrene, 60 parts of butadiene and 15 parts of reactive polymeric surfactant RPS-2 in 315 parts of water by maintaining the temperature of the reactant composition at 50° C. in a reactor under nitrogen atmosphere while adding, with stirring, over 2.5 hours an initiator composition containing 0.2 part of t-butylhydroperoxide in 10 parts of water, 0.5 part of mercaptoethanol in 10 parts of water and 0.5 part of sodium formaldehyde hydrosulfite (Formopon) in 10 parts of water and maintaining the temperature with stirring for an additional 6 hours. Then, 250 parts of water are added and 250 parts of volatiles are removed by stripping under vacuum at 60° C. A rub-stable latex (Latex 2B) is recovered having 27.7 percent of solids, an average particle diameter of 1870 Angstroms (by light scattering), an anionic charge per gram of solids of 0.182 milliequivalent and having 0.15 milliequivalent of bound sulfonate group per gram of solids.

A dried cast film from the latex is tough, flexible and clear.

What is claimed is:

1. An aqueous colloidal dispersion of anionic structured particles of organic polymer consisting of a nonionic polymer core encapsulated by a thin layer of a water-insoluble copolymer having pH independent anionic groups chemically bound to the copolymer at or near the particle surface; said anionic groups being present in an amount from about 0.15 milliequivalent to about 0.35 milliequivalent per gram of structured particles.

2. The aqueous colloidal dispersion of claim 1 in which the bound anionic groups are sulfonate.

* * * * *